(12) United States Patent
DiMichele et al.

(10) Patent No.: US 8,090,772 B2
(45) Date of Patent: *Jan. 3, 2012

(54) SEPARABLE URL GAMING SYSTEM

(75) Inventors: Carmen DiMichele, Sparks, NV (US); Russell Ristine, Reno, NV (US); James W. Morrow, Sparks, NV (US)

(73) Assignee: Bally Gaming, Inc., Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/758,724

(22) Filed: Apr. 12, 2010

(65) Prior Publication Data

US 2010/0205247 A1   Aug. 12, 2010

Related U.S. Application Data

(62) Division of application No. 10/956,398, filed on Sep. 30, 2004, now Pat. No. 7,707,242.

(51) Int. Cl.
 *G06F 15/16* (2006.01)
(52) U.S. Cl. ........ 709/203; 709/219; 709/226; 709/250; 463/42
(58) Field of Classification Search ................... 709/203, 709/217, 219, 226, 250; 463/16, 29, 30, 463/42
See application file for complete search history.

(56) References Cited

U.S. PATENT DOCUMENTS

| | | |
|---|---|---|
| 5,964,660 A | 10/1999 | James et al. |
| 6,012,984 A | 1/2000 | Roseman |
| 6,110,041 A | 8/2000 | Walker et al. |
| 6,113,495 A | 9/2000 | Walker et al. |
| 6,306,038 B1 | 10/2001 | Graves et al. |
| 6,701,376 B1 | 3/2004 | Haverstock et al. |
| 7,707,242 B2 * | 4/2010 | DiMichele et al. ........... 709/203 |
| 2002/0078206 A1 | 6/2002 | Boies et al. |
| 2002/0165023 A1 | 11/2002 | Brosnan et al. |
| 2003/0126283 A1 | 7/2003 | Prakash et al. |
| 2004/0059788 A1 | 3/2004 | Marcus |
| 2004/0106446 A1 | 6/2004 | Cannon et al. |
| 2004/0132532 A1 | 7/2004 | Brosnan et al. |
| 2004/0242322 A1 * | 12/2004 | Montagna et al. .............. 463/29 |
| 2005/0026670 A1 | 2/2005 | Lardie |
| 2005/0054445 A1 | 3/2005 | Gatto et al. |
| 2005/0221898 A1 | 10/2005 | Gatto et al. |
| 2006/0068906 A1 | 3/2006 | Morrow et al. |
| 2006/0075069 A1 | 4/2006 | Mohan et al. |

* cited by examiner

*Primary Examiner* — Oanh Duong
(74) *Attorney, Agent, or Firm* — Steptoe & Johnson LLP (57) ABSTRACT

A system and method for enabling one network to use the functionality of another network is provided. The system comprises a first network system having a first network functionality and a second network system having a second network functionality. A server connected to the second network system passes directions through the first network to enable a component connected to both the first network system and the second network system to perform a second network functionality.

16 Claims, 4 Drawing Sheets

SEPARABLE URL GAMING SYSTEM

CROSS REFERENCE TO RELATED APPLICATION

This patent application is a divisional of U.S. application Ser. No. 10/956,398, filed Sep. 30, 2004, now U.S. Pat. No. 7,707,242, issued Apr. 27, 2010, which is incorporated herein in its entirety.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD OF THE INVENTION

The invention generally relates to a system and method for providing one system with the ability to use the functional capabilities of another system, and more particularly, for providing one network with the functionality of another network.

BACKGROUND OF THE INVENTION

Today the components of older network systems utilize communication channels that have dated technology. These older networks are slow and difficult to manage as compared with more modern networks, such as Ethernet based networks. Since a vast number of these older network systems have already been deployed around the world, it would be a very arduous and expensive task to replace all of these components with ones built on newer technology.

However, the advent of newer technology has developed numerous desirable functions and features for network systems. Unfortunately these technological advances do not necessarily operate at a functional optimal capacity when used in the older gaming network system. Additionally, some of these technological advances are functionally incompatible with the older network systems and therefore cannot operate on the older network systems.

What is needed, therefore, is an effective and efficient means for updating the older systems and providing additional functionality to these system in a cost-efficient manner without compromising the trusted features established and provided by the older network systems. Accordingly, those skilled in the art have long recognized the need for a system and method for updating the older systems in order to provide the additional functionality associated with more modern gaming systems. The claimed invention clearly addresses these and other needs.

SUMMARY OF THE INVENTION

Briefly, and in general terms, the claimed invention resolves the above and other problems by providing a system for enabling an original network to leverage the resources of a supplementary network while substantially maintaining the architecture of the original network. The system includes an initial network, an auxiliary network, and a means for enabling the initial network to leverage the enhanced functionality resources of the auxiliary network. Preferably, the initial network has an original architecture and original functionality resources. The auxiliary network connects to the original architecture of the initial network and is in operative association with the initial network. The auxiliary network includes enhanced functionality resources. The enabling means are configured to supplement the initial network with the enhanced functionality resources of the auxiliary network while maintaining the architecture of the initial network.

In accordance with another aspect of a preferred embodiment, the initial network, for example, may not be Ethernet capable, and the auxiliary network is Ethernet capable or greater. Preferably, the initial network includes an initial network server and one or more initial network processors, which may each comprise, without limitation, a computer, a gaming machine, a kiosk, or the like. Further, in a preferred embodiment, the auxiliary network comprises an auxiliary network server including the enhanced functionality resources. The auxiliary network further comprises a locator server for assigning directions to each of the enhanced functionality resources.

In accordance with another aspect of a preferred embodiment, the enabling means comprises an enhanced functionality component for accessing enhanced functionality resources. The enhanced functionality component is independently connected both to the initial network and to the auxiliary network. Preferably, the enhanced functionality component receives directions for accessing an enhanced functionality resource to perform an auxiliary network function. In one preferred embodiment, the directions to the enhanced functionality resource are sent to the initial system server from the auxiliary system server, and then passed from the initial system server through the initial network to the enhanced functionality component. Lastly, after receiving said directions, the enhanced functionality component directly accesses an enhanced functionality resource through the auxiliary network. Preferably, the enhanced functionality component is an enhanced user interface. In another aspect of a preferred embodiment, the initial network further comprises one or more gaming machines. Preferably, the enhanced user interface is operatively connected to each of the one or more gaming machines.

In accordance with another aspect of a preferred embodiment, the directions are a locator, a pointer, a URL (universal resource locator), or an IP address. In one preferred embodiment, the first network further comprises a first network protocol, and the second network further comprises a second network protocol. In one such embodiment, the first network protocol and the second network protocol are not compatible with each other. In another such embodiment, the first network protocol and the second network protocol are compatible with each other.

In accordance with still another aspect of a preferred embodiment, the functionality resources of the first network are the same as the functionality resources of the second network, and the first network protocol is different from the second network protocol. In accordance with yet another aspect of a preferred embodiment, the functionality resources of the first network are the same as the functionality resources of the second network, and the first network protocol is the same as the second network protocol. In another preferred embodiment, the system includes one or more additional networks, wherein each of the one or more additional networks has a particular group of functionality resources, and wherein the system enables the first network to leverage the functionality resources of one or more of the additional networks.

In another preferred embodiment, the system is also configured to provide increased functionality resources to an initial network. The system comprises an initial network, an auxiliary network, and an enhanced user interface. The initial network connects a plurality of components that include a system server and one or more processors connected to the system server. The auxiliary network connects to the initial network and is configured to send and receive resource location data throughout the initial network. Preferably, the auxiliary network includes an auxiliary server, a location server for assigning resource location data, and data storage memory. The data storage memory is configured to store data including resource location data and increased functionality resources.

Preferably, an enhanced user interface is connected to each processor. In a preferred embodiment, the enhanced user interface receives embedded resource location data sent from the system server via the initial network, sends the resource location data to the auxiliary server through the auxiliary network to request an increased functionality resource, and receives an increased functionality resource sent by the auxiliary server through the auxiliary network for display by the enhanced user interface.

In still another preferred embodiment, the system is directed towards providing Hypertext Transfer Protocol (HTTP) operations to a non-HTTP enabled network with the assistance of an auxiliary server. The system includes a non-HTTP enabled network, an auxiliary network, and a HTTP-capable component. The non-HTTP enabled network connects a plurality of components, including a system server and one or more processors connected to the system server. The auxiliary network connects to the non-HTTP enabled network and is configured to send and receive URL data and web page data throughout the non-HTTP enabled network. Preferably, the auxiliary network includes an auxiliary server, a domain name server for assigning URLs, and data storage memory. Preferably, the data storage memory is configured to store data including URL data and web page data.

Preferably, a HTTP-capable component is connected to each processor. In a preferred embodiment, the HTTP-capable component receives an embedded URL message sent from the system server via the non-HTTP enabled network, uses the URL message to request a web page from the auxiliary server through the auxiliary network, and receives a web page sent by the auxiliary server through the auxiliary network for display by the HTTP-capable component.

In accordance with still another aspect of a preferred embodiment, the system further includes one or more network bridges, wherein each network bridge connects one or more processors to the system server. In another preferred aspect, the system server further comprises one or more additional system servers, and wherein each of the one or more additional servers provides system functions. In still another preferred aspect, the auxiliary server further comprises a means for assigning an IP address to each component connected to the non-HTTP enabled network. Preferably, the domain name server assigns a URL to each IP address. In one preferred embodiment, the non-HTTP enabled network is a gaming network. In another preferred embodiment, the non-HTTP enabled network is a financial network used in the financial industry. In accordance with still another aspect of a preferred embodiment, the one or more gaming machines are slot machines. In still another preferred embodiment, one or more gaming machines are video gaming machines.

In accordance with another preferred embodiment, the invention is directed towards a method for providing HTTP operations to a non-HTTP enabled gaming network. Preferably, the method includes: providing a non-HTTP enabled gaming network, wherein the gaming network includes a system server connected to the network and one or more gaming machines connected via the network to the system server; connecting a HTTP-capable component to each of the one or more gaming machines; connecting an auxiliary network to the non-HTTP enabled network, wherein the auxiliary network includes an auxiliary server; data storage memory, wherein the data storage memory is configured to store data including URL data and web page data; and a domain name server for assigning URLs; determining a need to send information to a gaming machine connected to the network, wherein the information is displayed as a web page on a HTTP connected to the gaming machine; sending a request from the system server to the auxiliary server for a URL, pointing to a web page having the needed information; sending a URL pointing to the particular web page from the auxiliary server to the system server embedding the URL in a network protocol message and sending the message from the system server to the HTTP-capable component through the gaming network; from the HTTP-capable component, using the URL to request a web page from the auxiliary server through the auxiliary network; and sending web page data from the auxiliary server to the HTTP-capable component through the auxiliary network for display on the HTTP-capable component.

These and other features and advantages of the present invention will become apparent from the following detailed description, taken in conjunction with the accompanying drawings, which illustrate by way of example, the features of the present invention.

DETAILED DESCRIPTION OF THE INVENTION

A preferred embodiment of the multi-network system, constructed in accordance with the invention, is directed towards a system and method for enabling an initial network to leverage the resources of a supplementary network while substantially maintaining the architecture of the original network. The system and method provide a more efficient way of introducing new features and functions to an initial network that would otherwise be less efficient and effective in its performance. The multi-network system is configured to supplement the initial network with the enhanced functionality resources of the auxiliary network, which would not otherwise be exploitable by the initial network, while substantially maintaining the architecture of the initial network. Referring now to the drawings, wherein like reference numerals denote like or corresponding parts throughout the drawings and, more particularly to FIGS. 1-4, there is shown one embodiment of a multi-network system.

Figure 1:
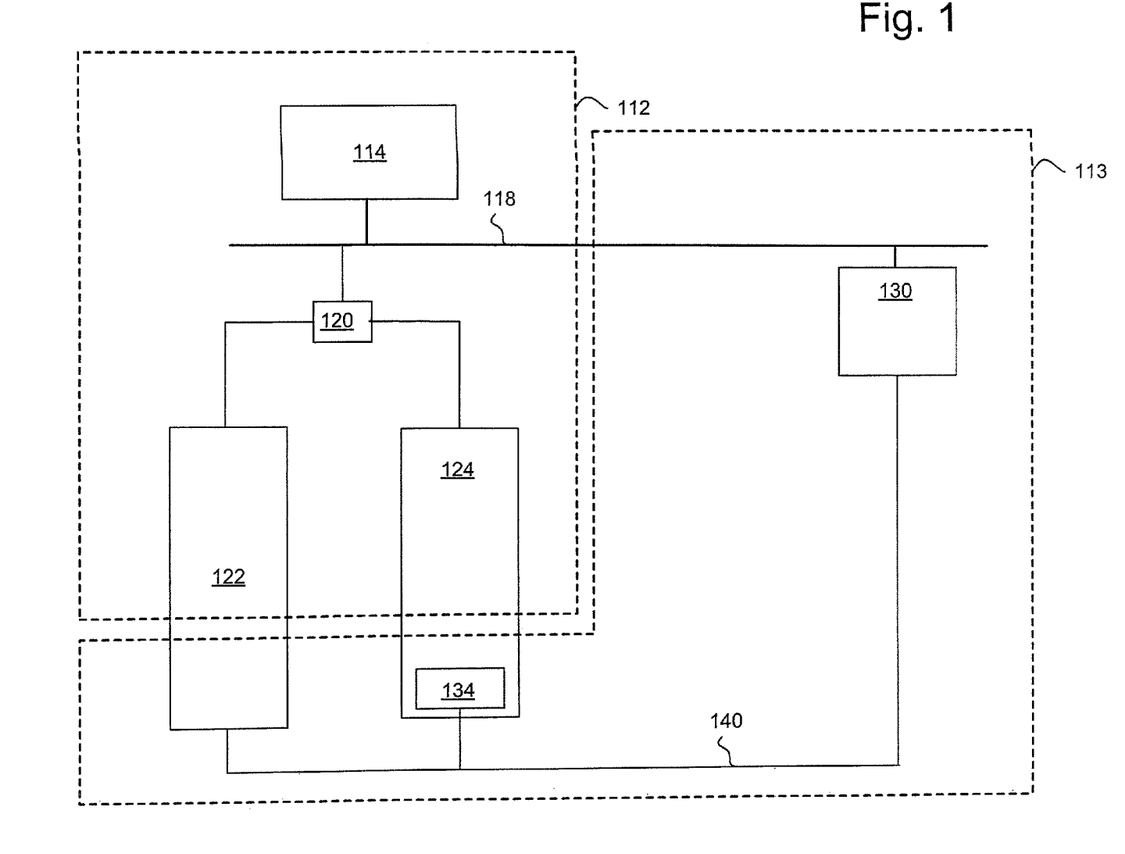
FIG. 1 is a schematic illustration of a system for enabling an initial network to leverage the resources of a supplementary network while substantially maintaining the architecture of the original network in accordance with an embodiment of the invention.

Referring now to FIG. 1, in one preferred embodiment, the system includes an initial network 112 (shown in phantom) and an auxiliary network 113 (shown in phantom) added to operate with the initial network 112. The addition of the auxiliary network 113 to the initial network 112 enables the initial network 112 to leverage the enhanced functionality resources of the auxiliary network 113. Preferably, the initial network 112 has an original architecture and original functionality resources. The auxiliary network 113 connects to the original architecture of the initial network 112 and is in operative association with the initial network 112. In the embodiment of FIG. 1, the initial network 112 may use a backbone legacy transport system 118, which may be in the form of a token ring, RS232, thin Ethernet, or other types of networking system known to those skilled in the art. The auxiliary network 113 may connect into the legacy transport system 118 in order to provide its enhanced functional resources, and thus, the initial network 112 maintains its original architecture.

In a preferred embodiment, the initial network 112, for example, may not be 100-base-T Ethernet capable, and the auxiliary network includes a 100-base-T Ethernet capable or greater backbone 140. Preferably, the initial network 112 includes an initial network server 114 and one or more network processors 122 and 124. In one preferred embodiment, the processors are game monitoring units 122 and 124 (GMUs) located inside of (or otherwise in operative association with) gaming machines.

The gaming machines may comprise stand-alone slots or video gaming machines. In one embodiment, the GMU may be located with, or inside of, a flat-screen terminal mounted on a casino table that can be used by a patron while playing a table game such as a card game, craps, roulette, or the like. These terminals accept the patron's casino or gaming club card, or a user name and password, to identify the player. This allows the same types of promotional and bonus incentives to be sent to table game players as with slot or video gaming machine players, and to interact with the server 114 or other gaming machines in the networks 112 and 113.

The function of a GMU is similar to the function of a network interface card connected to a desktop personal computer (PC). The GMUs perform functions such as monitoring player information, coin in, and the like. The auxiliary network 113 includes an auxiliary network server 130, including the enhanced functionality resources. The auxiliary network 113 further includes a locator server, which may comprise a virtual server within the auxiliary server 130, for assigning directions to each of the enhanced functionality resources. Alternatively, the auxiliary server 130 may comprise a number of computers or processing devices connected in a distributed processing system.

In a preferred embodiment, a processor 124 (GMU) interacts with an enhanced functionality component 134, such as an embedded user interface in a gaming machine, for accessing enhanced functionality resources (e.g., web browser capabilities). In the preferred embodiment shown in FIG. 1, the other processor 122 includes the functionality of both a GMU and an enhanced functionality component 134 within the processor 122, and thus, is already capable of utilizing the enhanced functionality resources without the addition of an enhanced functionality component 134. In other words, the other processor 122 may be combined with an enhanced functionality component into a single unit that is capable of using the accessed-enhanced functionality resources, as well as performing the previous processor (GMU) functions.

As shown in FIG. 1, in a preferred embodiment, the enhanced functionality component 134 (or processor 122, which contains the capabilities of the enhanced functionality resources) is independently connected both to the initial network 112 and to the auxiliary network 113. Preferably, the enhanced functionality component 134 receives directions for accessing an enhanced functionality resource to perform an auxiliary network function. In one preferred embodiment, the directions for the enhanced functionality resource are sent to the initial system server 114 from the auxiliary system server 130, and then passed from the initial system server 114 through the initial network 113 to the enhanced functionality component 134. Lastly, after receiving these directions, the enhanced functionality component 134 directly accesses an enhanced functionality resource through the auxiliary network 113.

In this manner, the architecture and utility of the initial network 112 is still maintained and functional; however, the auxiliary network 113 is still leveraged for the enhanced functionality resources of the auxiliary system server 130, as well as the performance capabilities of the auxiliary network 113 itself (i.e., the 100-base-T Ethernet performance capabilities of the auxiliary network 113). As stated above, the enhanced functionality component 134 receives directions for accessing an enhanced functionality resource to perform an auxiliary network function. The directions can be one or many formats or protocols, including by way of example only, and not by way of limitation, a locator, a pointer, a URL (universal resource locator), resource location data, or an IP address.

In one preferred embodiment, the enhanced functionality component 134 is an enhanced user interface that includes a web page display screen and an embedded processor. Referring again in FIG. 1, in one specific preferred embodiment, the processors 122 and 124 in the initial network 112 comprise one or more gaming machines. Preferably, the enhanced user interface 134 is operatively connected to each of the one or more gaming machines 122 and 124 that are not capable of displaying the enhanced functionality resource (e.g., browser and/or web page capabilities, and the like) without the enhanced user interface. As stated above, in the example of FIG. 1, the gaming machine 122 (or more specifically, the modern GMU with an incorporated, enhanced user interface located within the gaming machine) may already have this capability.

In one preferred embodiment, the initial network 112 uses a first network protocol (e.g., non-Hypertext Transfer Protocol (HTTP), non-browser enabling protocol, and the like) and the auxiliary network 113 uses a second network protocol (e.g., Hypertext Transfer Protocol (HTTP), browser enabling protocol, and the like). However, in another preferred embodiment, the initial network 112 and the auxiliary network 113 both use the same protocol. In a preferred embodiment, the enhanced functionality resources of the auxiliary network 113 exceed the functionality resources of the initial network 112, in quantity and/or complexity, thereby enabling the initial network 112 to leverage the enhanced functionality resources of the auxiliary network 113. However, in another preferred embodiment, the auxiliary network 113 includes functionality resources that do not necessarily exceed the functionality resources of the initial network 112, in quantity and/or complexity. Nevertheless, in such an embodiment, the system of the claimed invention still enables the initial network 112 to leverage the additional functionality resources of the auxiliary network 113.

As described above, in a preferred embodiment, the initial network 112 connects a plurality of components that include a system server 114 and one or more processors 122 and 124 connected to the system server. Preferably, the processors 122 and 124 are connected to the system server 114 through a network bridge 120. Continuing, the auxiliary network 113 connects to the initial network 112 and is configured to send and receive resource location data throughout the initial network 112. In a preferred embodiment, the auxiliary network includes an auxiliary server 130, a location server for assigning resource location data, and data storage memory. Preferably, the data storage memory is configured to store data including resource location data and increased functionality resources.

In one preferred embodiment, the system is directed towards providing browser operations to a non-browser enabled network with the assistance of an auxiliary server 130. The initial network 112 may comprise a non-browser enabled network 112. The auxiliary network 113 is for providing browser capability to a browser-capable component 134 added to processors 122 and 124 that are not browser-capable. The non-browser enabled network 112 connects a plurality of components, including the system server 114, and the one or more processors 122 and 124 connected to the system server 114. The auxiliary network 112 connects to the non-browser enabled network and is configured to send and receive URL data and web page data throughout the non-browser enabled network 112. Preferably, the auxiliary network 113 includes an auxiliary server 130, which may also be a domain name server for assigning URLs and data storage memory. Preferably, the data storage memory is configured to store data including URL data and web page data. In one preferred embodiment, the auxiliary server 130 is a Windows® based server.

Preferably, a browser-capable component 134 is connected to each processor 122 and 124 that is not already browser-capable. In a preferred embodiment, the browser-capable component receives an embedded URL message sent from the system server 114 via the non-browser enabled network 112, uses the URL message to request a web page from the auxiliary server 130 through the auxiliary network 113, and receives a web page sent by the auxiliary server 130 through the auxiliary network 113 for display by the browser-capable component 134.

In a preferred embodiment, the system further includes one or more network bridges 120, wherein each network bridge 120 connects one or more processors 122 and 124 to the system server 114. Preferably, a network bridge 120 facilitates communications between the server 114 and the gaming machines 122 and 124. In another preferred embodiment having many gaming machines, the network bridge 120 concentrates the many gaming machines (2,000 on average) into a fewer number (nominally 50:1) of connections to the system server 114. Preferably, the system server 114 further includes one or more additional system servers, and wherein each of the one or more additional servers provides system functions.

In still another preferred aspect, the auxiliary server 130 further contains a domain name service (DNS) server function for assigning an IP address to each component connected to the non-browser enabled network 112. Preferably, the DNS server function of the auxiliary server 130 assigns a URL to each IP address. The DNS server maintains a database of domain names (host names) and their corresponding IP addresses. Each component connected to the non-browser enabled network is assigned an IP address. The IP addresses can be assigned by an administrator in the auxiliary server or may be assigned automatically.

In one preferred embodiment, the non-browser enabled network 112 is a gaming network, and the one or more gaming machines 122 and 124 are slot machines and/or video gaming machines such as video slots and video poker. Further, the gaming machines 122 and 124 may be any casino-type game. In another preferred embodiment, the non-browser enabled network 112 is a non-gaming network, such as a financial network used in the financial industry.

As described above, in one preferred embodiment, FIG. 1 illustrates a system for providing browser operations to a non-browser enabled gaming network 112. The non-browser enabled gaming network 112 (initial network) includes one or more gaming machines 122 and 124 (that contain or are in operative connection with a processor/GMU), and a system server 114 (initial server), also called a back-end server. The non-browser enabled gaming network 112 uses a gaming network protocol that does not support browser technology (e.g., non-Hypertext Transfer Protocol (HTTP), non-browser enabling protocol, and the like).

A variety of servers may be used as the system server 114. The type of server used is generally determined by the platform and software requirements of the gaming system. Additionally, the system server 114 may be configured to comprise multiple servers. One preferred embodiment includes a system server configured to include three servers. In one example, the first system server 114 is a Windows® based server, the second system server 114 is an IBM® RS6000 based server, and the third system server 114 is an IBM AS/400 based server. Of course, one of ordinary skill in the art will appreciate that different types of servers may also be used.

Referring again to FIG. 1, the system server 114 performs several fundamental activities. For example, the server 114 collects data from the gaming floor as communicated to it from gaming hardware or another server. This collected data is maintained by the server 114 in a database. The server 114 uses the collected floor data to generate a report detailing functions in casino operations. These reports include, but are not limited to accounting reports, security reports, and usage reports. The server 114 may pass the collected data to another server for other functions. Additionally, the server 114 may pass the data stored in its database to floor hardware for interaction with a game or a game player. Such player information includes, but is not limited to, the player's name or amount of a ticket being redeemed at a game.

FIG. 1 also shows an auxiliary server 130 connected to the non-browser enabled gaming network 112 via the auxiliary network 113. The auxiliary server 130 provides features and functionality not supported by the non-browser enabled gaming network 112. Such features and functions include, but are not limited to, enabling the player to use a web browser on a slot machine, downloading new artwork for a particular game which will be encrypted and authenticated on receipt, and allowing service personnel to view month-old game performance data stored on the auxiliary server 130 through a web browser connected to the gaming machine.

Additionally, FIG. 1 shows browser-capable components 134, which support browser technology and enable the performance of browser functions. Preferably, the browser-capable components 134 include Web browsers (or other types of web page display screens). As described above, the browser-capable components 134 are directly connected to the auxiliary server 130 and allow access to information stored on the auxiliary server, thus permitting the operation of functions and features not effectively supported by the initial network 112.

For example, in one preferred embodiment, the browser-capable component 134 includes a 100-base-T Ethernet network connection as the direct connection between the browser-capable components 134 and the auxiliary server 130. Further, in one preferred embodiment, the browser-capable component 134 connects to the initial network 112 through a standard GMU (processor) 124. In some embodiments herein, the gaming machine is referred to as part number 124 since the GMU (processor) is preferably located within the gaming machine.

Referring now to the functions and features not effectively supported by the initial network 112, in one preferred embodiment, a non-browser enabled gaming network 112 uses a network protocol that does not support traditional browser technology. However, each browser-capable component 134 includes a browser having a program using Hypertext Transfer Protocol (HTTP) to retrieve information provided by an HTTP server (auxiliary server 130). In one preferred embodiment, the browser-capable component requests a URL, and then displays the rendered information on a web page display screen (browser) incorporated into the browser-capable component 134. Additionally, the browser provides a graphical user interface for receiving or sending multimedia information.

Providing the browser technology to the non-browser enabled gaming network 112 allows a game player to interact more fully with particular back-end system equipment, such as the server 114. Additionally, providing browser technology also facilitates additional functionality, such as allowing access to game software maintained on the server 114 and downloading the software maintained on the server 114.

In some embodiments, instead of a browser technology, or in combination with browser technology, the component 134 may comprise a Flash® MicroMedia® container or any one of a number of other types of media or interactive front end devices.

As briefly described above, in one preferred embodiment, the gaming network 112 includes one or more game monitoring units (GMUs). The GMU connects a gaming machine to the network bridge, and thus, to the rest of the gaming network 112. The GMU also monitors some gaming related activities. Typically, GMUs perform functions such as monitoring player information, coin in, and the like. In some respects, the function of the GMU is analogous to the function of a network interface card connected to a desktop PC. Referring back to FIG. 1, a GMU is located within the gaming machine 122 and is connected to the network bridge 120. Typically, a traditional GMU does not have browser capabilities, but rather assists in the sending and receiving of legacy protocol messages (i.e., serial data messages).

Additionally, the processor 124 (GMU) interacts with an enhanced functionality component 134, such as an embedded user interface in a gaming machine for accessing enhanced functionality resources (e.g., web browser capabilities). As stated above, in another preferred embodiment, the processor 122 includes the functionality of both a GMU and an enhanced functionality component 134 within the processor 122, and thus, is capable of web browser capabilities without the addition of an enhanced functionality component 134.

Referring again to FIG. 1, in another preferred embodiment, the gaming machines are modernized gaming machines 122 that include the processor (GMU), which has been combined with an enhanced functionality component into a single unit that is capable of using the accessed, enhanced, functionality resources, as well as performing the previous processor (GMU) functions. The enhanced functionality component is not shown in gaming machine 122 due to its full incorporation into the gaming machine.

In contrast, the gaming machine 124 includes an embedded browser-capable component 134 having a browser interface (not shown) that displays web pages on an incorporated browser interface. The incorporated viewing device of the embedded browser-capable component 134 is separate from the game screen on the gaming machine 124. Typically, standard gaming machines do not support browser technology and are not directly connected to the auxiliary server 130. Thus, standard gaming machines must incorporate a browser-capable component in order to directly connect to the auxiliary server. Accordingly, a browser-capable component 134 is connected to the gaming machine 124, and a browser-capable component (not shown) is fully incorporated to the gaming machine 122, in order to support browser technology and enable browser functions. Each browser-capable component typically includes a web page display device (not shown) for displaying browser data, including web pages. The web page display device is separate from the game screen of the gaming machines 122 and 124.

In another preferred embodiment, additionally components of the network may have browser capabilities and browser functions. For example, in one embodiment, the network bridge acts as a network hub. The network bridge includes a DNS server and routes information in the form of URLs between the gaming machines and the servers.

In another embodiment, the GMUs include more functionality than the standard GMUs. Such increased functionality includes, by way of example only, and not by way of limitation, calculation of a promotional cash-back award for a player, generation of a unique ID for a cash redeemable ticket, and providing a user interface to allow a player to look up personal information maintained by a back-end server.

An example of a communication using an embodiment of the system for providing browser operations to a non-browser enabled gaming network (legacy network) is described below. Referring again to FIG. 1, a player presents a player ID to the gaming machine 124. The system server 114 receives the player input data and identifies the player interacting with the gaming machine 122. The system server 114 makes the determination to send a particular web page recognizing that it is the player's birthday.

The system server 114 then requests a URL (universal resource locator) from the auxiliary server 130 that points to a particular web page. The system server 114 receives the URL and builds a message consisting of the typical gaming system player entry response message. Additionally, the system server 114 embeds, or encapsulates, the URL into a legacy network system protocol message, also called a legacy message.

The system server 114 sends this legacy message to the network bridge 120, via the legacy network (initial network 112). The network bridge 120 receives the legacy message having the embedded URL and directs the legacy message to the browser-capable component 134. Again, the legacy message having the embedded URL is sent via the legacy network (initial network 112). The legacy message is received by the browser-capable component 134. In this example, the browser-capable component 134 is an enhanced user interface that includes web page display screen and an embedded processor.

The browser-capable component 134 is directly connected to the auxiliary server 130 via a modem, auxiliary network 113. After receiving the legacy message with the embedded URL, the browser-capable component 134 uses the URL to request web page data from the auxiliary server 130. The request is sent to the auxiliary server 130 via the modem, auxiliary network 113. The auxiliary server 130 receives the request and sends the web page data to the browser-capable component 134 over the modem, auxiliary network 113 for display on the browser of the browser-capable component 134.

Thus, the auxiliary network 113 sends the web page data from the auxiliary server 130 to a browser-capable component 134, upon request, far more effectively than web page data that could be manipulated in the legacy network 112, while maintaining the architecture of the legacy network 112. Attempting to utilize the legacy network 112 to accomplish such functionality would be extremely time consuming, and the legacy network would require new development in all related components to handle the modern, auxiliary network protocols. Further, if the player input data had been sent via the modern, auxiliary network, it would require development on all equipment associated with the modern, auxiliary network to handle legacy type messaging.

Figure 2:
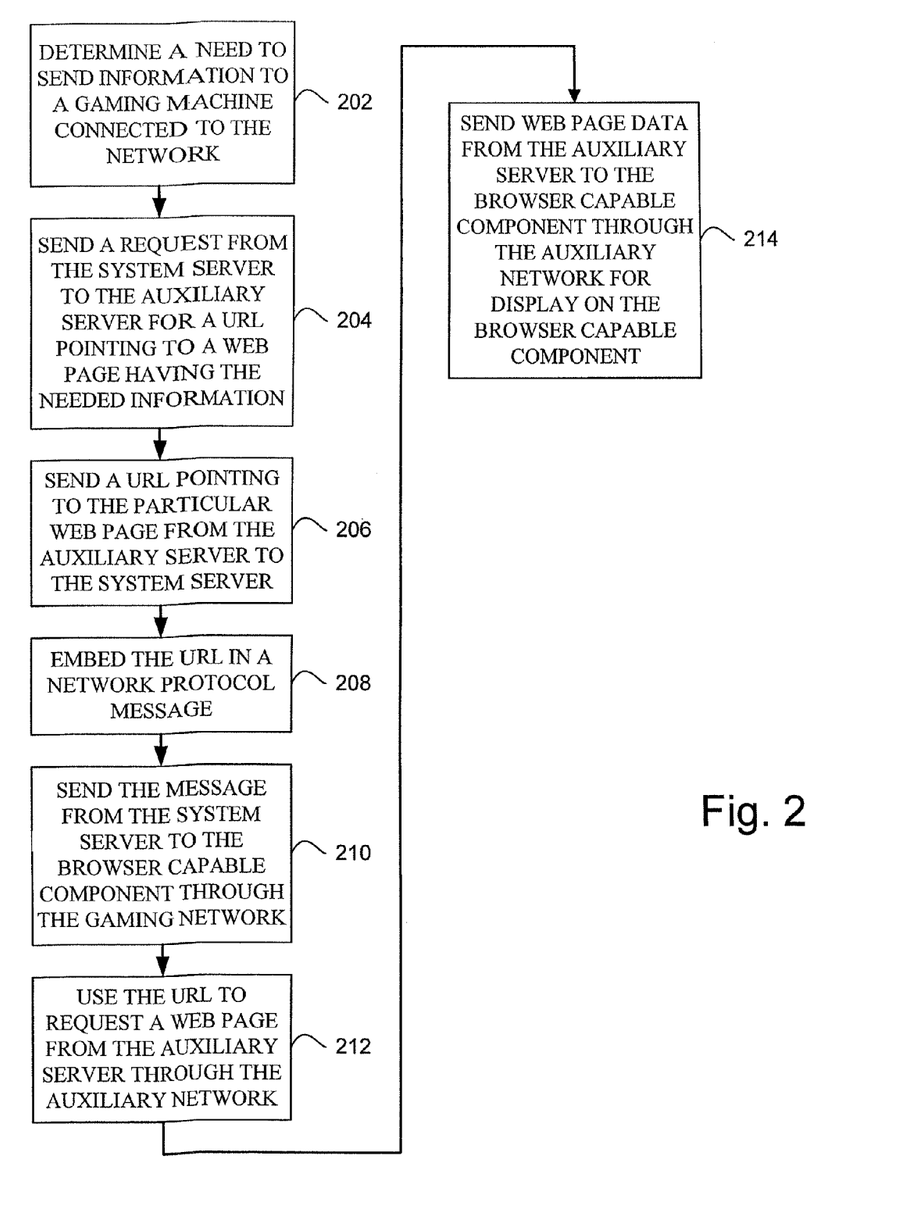
FIG. 2 is a flow diagram illustrating the steps performed in a method used by the system in FIG. 1.

With reference to FIG. 2, a flow diagram illustrates a method performed in accordance with another preferred embodiment for providing browser operations to a non-browser enabled gaming network. Preferably, the method includes providing a non-browser enabled gaming network, wherein the gaming network includes a system server connected to the network and one or more gaming machines connected via the network to the system server. The method continues connecting a browser-capable component to each of the one or more gaming machines and connecting an auxiliary network to the non-browser enabled network. Preferably, the auxiliary network includes an auxiliary server, domain name server for assigning URLs, and data storage memory, wherein the data storage memory is configured to store data including URL data and web page data.

At Step 202, the method includes determining a need to send information to a gaming machine connected to the network, wherein the information is displayed as a web page on a browser connected to the gaming machine. Next, at Step 204, the method includes sending a request from the system server to the auxiliary server for a URL pointing to a web page having the needed information. Continuing at Step 206, the method includes sending a URL pointing to the particular web page from the auxiliary server to the system server. At Step 208, the method includes embedding the URL in a network protocol message. Next, at Step 210, the method includes sending the message, with embedded URL, from the system server to the browser-capable component through the gaming network. At Step 212, the method includes, from the browser-capable component, using the URL to request a web page from the auxiliary server through the auxiliary network. Finally, at Step 214, the method includes sending web page data from the auxiliary server to the browser-capable component through the auxiliary network for display on the browser-capable component.

Figure 3:
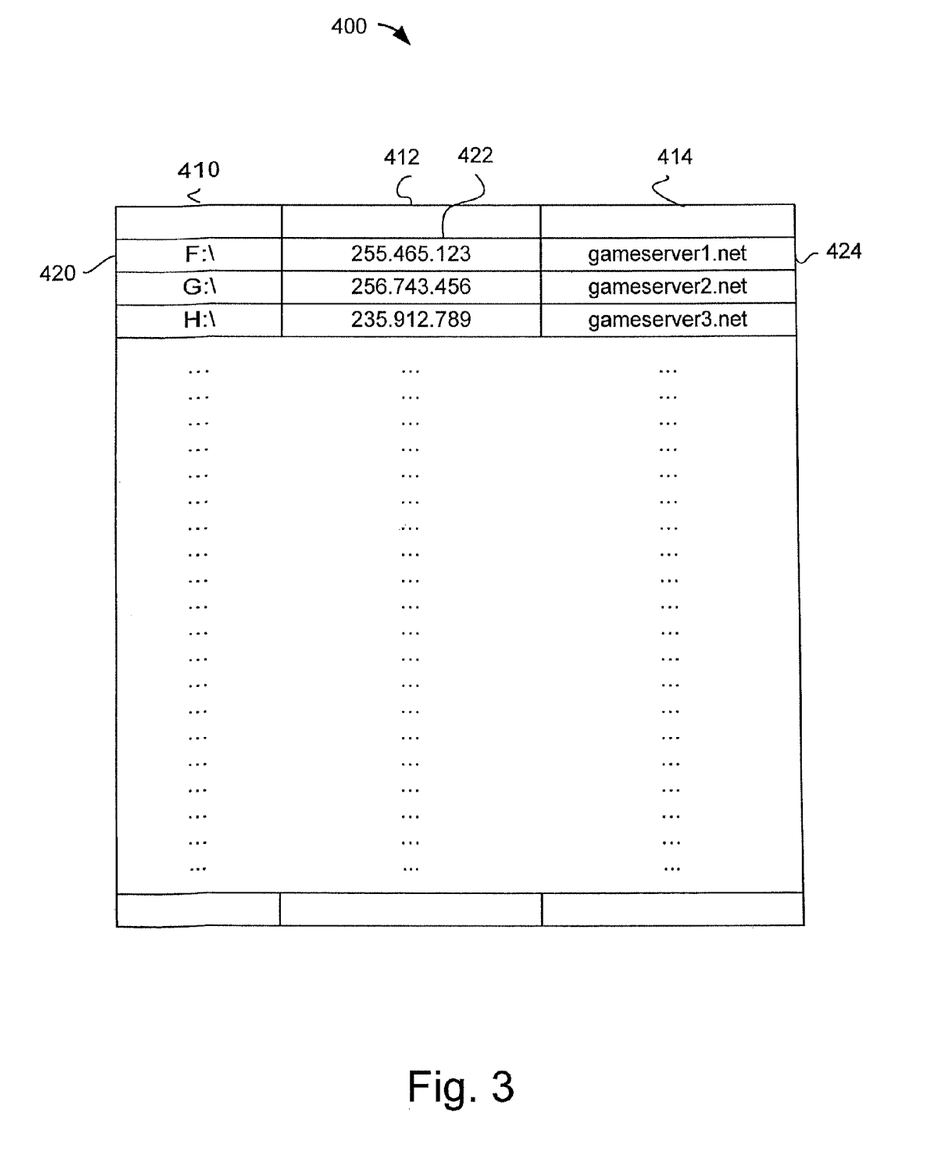
FIG. 3 is an illustration of a database for use with an embodiment of the invention.

FIG. 3 illustrates an example of a database 400 describing the assigned IP addresses and domain names. The column 410 identifies each component on the network. For example, in field 420, of column 410, a RS6000 server is identified as the "F:\" drive on the Ethernet network. Additionally, the other components on the gaming network, such as the gaming machines, recognize the RS6000 as the "F:\." Column 412 and column 414 in database 400 lists the corresponding IP address and domain name, respectively, for each component identified in column 410. For example, field 422, in column 412, lists the corresponding IP address for the F:\ drive as "255.465.123" and field 424, in column 414, lists the corresponding domain name as "gameserver1.net."

Assigning IP and URL addresses to the components in the network allows the systems in the two networks 112 and 113, and outside the networks 112 and 113, such as Internet applications, to use HTTP protocol to access component information. For example, two gaming machines 122 and 124 in the initial network 112 may each use their enhanced functionality components 134 to execute a peer-to-peer chat session between gaming machines. Each of the two gaming machines 122 and 124 is assigned an IP address and a URL. During initiation of a chat session, a first gaming machine 122 may use the DNS function of the auxiliary server 130 by sending a DNS request for a second gaming machine 124 to the auxiliary server. The auxiliary server 130 looks up the IP address in the DNS database 400 to retrieve the IP address for the second gaming machine 124. The IP address is sent back to the first gaming machine 122 so that the first gaming machine 122 may then send an HTTP chat session message to the second gaming machine 124. Since the second gaming machine 124 will receive the IP address of the first gaming machine 122 with the received HTTP chat session message, the two gaming machines 122 and 124 will then have the needed IP addresses for each other in order to execute a chat session between them.

In this respect, in some embodiments, the same methodology may be used for general data exchange between, without limitation, two or more users, a user and a sever, a technician and any network device, and the like. For example, in a gaming network, the system allows for the gaming machines 122 and 124 to go into a mode where two players could work together for a bonus or against one another.

In another embodiment, one or more of the processors 122 and 124 may comprise a kiosk device, allowing users to, for example, redeem cash for gaming coupons. The DNS function of the auxiliary server, for example, could provide for the connection to one or more gaming or administrative servers 114 in the same way that the connection would be provided for a chat session. In this case, however, once the connection is established, a secure sockets layer (SSL) technique may be applied for a secure connection to the gaming or administrative server 114. The one or more kiosks 122 and 124 may also provide a media portal into the system, allowing users to, for example, buy airline tickets or find people logged into the system who are on a user's "buddy list."

Other uses for the DNS function of the auxiliary server would be recognized by those skilled in the art, including ping requests, Internet electronic commerce, Internet usage by the processors or gaming machines 122 and 124, and the like. When a component inside or outside the two networks 112 and 113 needs to access a network component, instead of having to render the local protocol of the initial network 112, DNS requests followed by HTTP protocol requests may be used in order to communicate with the components.

In one embodiment, some of the non-browser enabled components are never actually aware of their assigned IP address and URL. In those cases, as in the example given above with respect to FIG. 2, the requests to a particular component are handled by the auxiliary server 130. For example, the network server 114 may not be browser enabled, or capable of communicating using HTTP protocol. Whenever a DNS request for information from the network server 114 is provided to the auxiliary server, the auxiliary server 130 may act as a proxy server for the network server 114, in that the IP address for the network server 114 points to a sub-directory on the auxiliary server. After a DNS request, if the HTTP requests are received for the network server 114, the web page may be retrieved from the designated sub-directory if it already exists there already. This would be the case, for example, if a system administrator has put certain commonly requested web pages in the designated sub-directory for the network server 114.

However, as the example of FIG. 2 illustrates, at least some of the time, the HTTP request may be for non-static information that needs to come from the network server 114 itself. In that case, the method of FIG. 2 may be used to create the web page containing the necessary information in the sub-directory for the network server 114 on the auxiliary server 130. Dynamic creation of web pages containing the requested information may be accomplished using such methods as active server page (ASP), dynamic HTML, or PERL scripting. The HTTP request may then be answered by sending the created web page to the requester.

Figure 4:
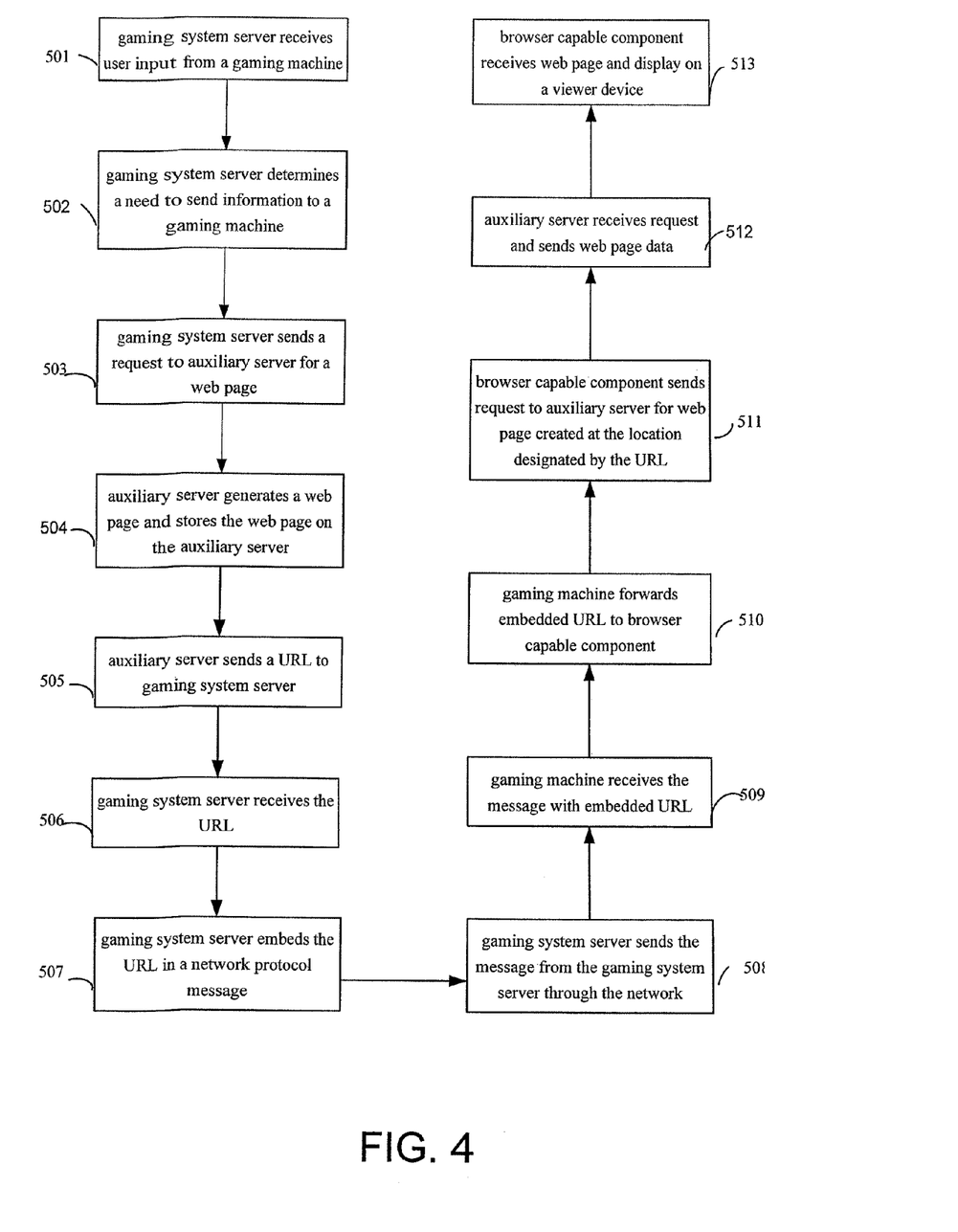
FIG. 4 is a flowchart illustrating a method for providing HTTP operations to a non-HTTP enabled gaming network in accordance with another embodiment of the invention.

Referring now to FIG. 4, a method for providing operations to a non-browser enabled gaming network is illustrated. In step 501, the gaming system server receives user input from a gaming machine. From the received user input, the gaming system server may determine that there is a need to send information to one of the gaming machines on the initial network 112, step 502, for the gaming machine to display as a web page on a browser connected to the gaming machine.

Next, in step 503, the gaming system server sends a request to the auxiliary server for a web page. The auxiliary server generates a web page and stores the web page on the auxiliary server, step 504. The auxiliary server then sends a URL to the gaming system server, step 505. The URL points to the location of the web page stored on the auxiliary server. The gaming system server receives the URL, step 506, and embeds the URL in a network protocol message, step 507, and sends the message from the gaming system server through the initial network, step 508.

The gaming machine receives the message with the embedded URL, step 509. The URL is forwarded to a browser-capable component connected to the gaming machine, step 510. The browser-capable component sends a request to the auxiliary server for the web page created at the location designated by the URL, step 511. The auxiliary server receives the request and sends the web page, step 512. Once received, the web page is displayed on a viewer device connected to the browser-capable component, step 513.

In still another preferred embodiment, a system enabling a first network system to use the functionality of a second network system is provided. The system comprises a first network 112 having a first network functionality and a second network 113 having a second network functionality. The first network 112 and the second network 113 are configured to communicate with one another. The system provides a means for enabling the first network 112 to use the second network functionality. Examples of networks include but are not limited to LAN (local area network), WAN (wide area network), the Intranet, and Extranet.

Referring back to FIG. 1, to reiterate, the first network 112 and second network 113 are connected via a network connection using a network protocol supported by both networks. The second network server 130 assigns a location identifier to any resource connected to at least one of the first network and second network. The location identifier represents the location of the resource on the network. Resources include, but are not limited to network components, network hardware, and data. A resource may comprise features used to enable network functions. For example, a first resource may include a feature used to perform a functionality of the second network 113.

The first network server 114 is triggered to need a particular functionality. Examples of triggers, include, but are not limited to, receiving user input, time of day and the occurrence of an event. In one embodiment, the first network 112 needs a functionality of the second network 113. The first network server 114 sends a request to the second network server 130 for directions in accessing a resource needed to perform the second network functionality. The request is sent via a network connection using network protocol supported by both the first network 112 and the second network 113. The second network server 130 receives the request, identifies the location identifier of the resource, and determines directions for accessing the resource based upon the location identifier. The second network server 130 then sends to the first network server 114, directions for accessing the resource. In optional embodiments, the directions may be a pointer, locator, URL or IP address.

The first network server 114 receives the directions and embeds the directions in a first network system protocol message, referred to herein as a first message. The first network server 114 sends the first message to a first network processor 124. The first network processor receives the message and sends it to a second-network functionality component 134 connected to the first network processor 124. This component 134 is a device that supports the functionality of the second network.

The second network functionality component 134 receives the first message having the embedded directions and sends, to the second network server 130, the directions and a request for features of the resource. The second network functionality component 134 is connected to the second network server 130 via a second network adapter. The second network server 130 receives the request and sends the features of the resource. The second network functionality component 134 receives the features of the resource and is then able to perform a second network functionality.

Furthermore, the various methodologies described above are provided by way of illustration only and should not be construed to limit the invention. For example, in any embodiment, instead of using a separate auxiliary server 130 to provide the advanced or enhanced features, and the DNS server function, to the initial network 112, one of the existing servers 114 may be configured to perform all of the aforementioned functions of the auxiliary server 130. Further, instead of using a DNS server function, a simple table lookup function may be used to traverse the table in FIG. 3 to translate URLs to IP addresses, or virtual or physical locations on the network. Finally, the auxiliary network 113 may also include various bridges, routers, and switches as needed and used in typical local or wide-area networks as those skilled in the art may recognize.

Those skilled in the art will readily recognize that various modifications and changes may be made to the present invention without departing from the true spirit and scope of the present invention. Accordingly, it is not intended that the present invention be limited, except as by the appended claims.

What is claimed is:

1. A system for providing Hypertext Transfer Protocol (HTTP) operations to a non-HTTP enabled network, the system comprising:
    a non-HTTP enabled network connecting a plurality of components, the components comprising:
        a system server, and
        one or more gaming machines connected to the system server;
    an auxiliary network connected to the non-HTTP enabled network, wherein the auxiliary network is configured to send and receive URL data and web page data throughout the non-HTTP enabled network, and for sending requested web page data, the auxiliary network comprising:
        auxiliary server;
        data storage memory, wherein the data storage memory is configured to store data including URL data and web page data;

a domain name server for assigning URLs; and
an HTTP capable component connected to each of the one or more gaming machines, wherein the HTTP capable component receives embedded URL messages sent from the system server via the non-HTTP enabled network in a non-HTTP protocol, uses the URL messages to request web pages from the auxiliary server through the auxiliary network in a HTTP enabling protocol, and receives the web pages sent by the auxiliary server through the auxiliary network for display by the HTTP capable component.

2. The system of claim 1, further comprising: one or more network bridges, wherein each of the network bridges connects the one or more gaming machines to the system server.

3. The system of claim 2, wherein each of the gaming machines comprises a game management unit connecting the gaming machine to one of the bridges.

4. The system of claim 3, wherein the HTTP capable component is a game management unit connected to the gaming machine.

5. The system of claim 1, wherein the system server further comprises one or more additional system servers, and wherein each of the one or more additional servers provides gaming system functions.

6. The system of claim 1, wherein the auxiliary server further comprises means for assigning an IP address to each component connected to the non-HTTP enabled network.

7. The system of claim 6, wherein the domain name server assigns a URL to each IP address.

8. The system of claim 1, wherein the one or more gaming machine is a slot machine.

9. The system of claim 1, wherein the one or more gaming machine is a video gaming machine.

10. A system for providing IP address enabling operations to a non-IP address enabled network, the system comprising:
a non-IP address enabled network connecting a plurality of components, the components comprising:
a system server; and
one or more processors connected to the system server;
an auxiliary network connected to the non-IP address enabled network, wherein the auxiliary network is configured to send and receive URL data and web page data throughout the non-IP address enabled network, the auxiliary network comprising:
auxiliary server;
data storage memory, wherein the data storage memory is configured to store data including the URL data and the web page data;
a domain name server for assigning URLs; and
an IP address-capable component connected to each of the one or more processors, wherein the IP address-capable component receives an embedded URL message sent from the system server via the non-IP address enabled network in a non-IP address enabling protocol, uses the embedded URL message to request a web page from the auxiliary server through the auxiliary network in a IP address enabling protocol, and receives the web page sent by the auxiliary server through the auxiliary network for display by the IP address-capable component.

11. The system of claim 10 further comprising: one or more network bridges, wherein each of the one or more network bridges connects the one or more processors to the system server.

12. The system of claim 10, wherein the gaming system server further comprises one or more additional system servers, and wherein each of the one or more additional servers provides system functions.

13. The system of claim 10, wherein the auxiliary server further comprises means for assigning an IP address to each component connected to the non-IP address enabled network.

14. The system of claim 10, wherein the domain name server assigns a URL to each IP address.

15. The system of claim 10, wherein the non-IP address enabled network is a gaming network.

16. The system of claim 10, wherein the non-IP address enabled network is a financial network used in the financial industry.

* * * * *

UNITED STATES PATENT AND TRADEMARK OFFICE
CERTIFICATE OF CORRECTION

| | | |
|---|---|---|
| PATENT NO. | : 8,090,772 B2 | |
| APPLICATION NO. | : 12/758724 | |
| DATED | : January 3, 2012 | |
| INVENTOR(S) | : Carmen DiMichele, Russell Ristine and James W. Morrow | |

It is certified that error appears in the above-identified patent and that said Letters Patent is hereby corrected as shown below:

Column 1 - In line 49, replace "system" with --systems--

Column 4 - In line 5, replace "a" with --an--

Signed and Sealed this
Twentieth Day of March, 2012

David J. Kappos
*Director of the United States Patent and Trademark Office*